(12) United States Patent
Park et al.

(10) Patent No.: US 8,974,757 B2
(45) Date of Patent: Mar. 10, 2015

(54) METHODS AND SYSTEMS FOR SYNTHESIZING IRON-BASED MATERIALS AND SEQUESTERING CARBON DIOXIDE

(75) Inventors: Ah-Hyung Alissa Park, New York, NY (US); Liang-Shih Fan, Columbus, OH (US); Hyung Ray Kim, Columbus, OH (US)

(73) Assignee: The Trustees of Columbia University in the City of New York, New York, NY (US)

( * ) Notice: Subject to any disclaimer, the term of this patent is extended or adjusted under 35 U.S.C. 154(b) by 593 days.

(21) Appl. No.: 13/319,831

(22) PCT Filed: May 14, 2010

(86) PCT No.: PCT/US2010/034921
§ 371 (c)(1),
(2), (4) Date: May 22, 2012

(87) PCT Pub. No.: WO2010/132784
PCT Pub. Date: Nov. 18, 2010

(65) Prior Publication Data
US 2012/0225007 A1    Sep. 6, 2012

Related U.S. Application Data

(60) Provisional application No. 61/178,272, filed on May 14, 2009.

(51) Int. Cl.
*B01D 53/62* (2006.01)
*C01B 3/02* (2006.01)
(Continued)

(52) U.S. Cl.
CPC .............. *C01B 3/105* (2013.01); *C01G 49/06* (2013.01); *C01B 2203/86* (2013.01); *Y02E 60/36* (2013.01)

USPC ........... 423/220; 423/224; 423/230; 423/231; 423/658

(58) Field of Classification Search
CPC .................................... C01B 2203/0233
USPC .......... 423/650, 644, 220, 224, 230, 231, 658
See application file for complete search history.

(56) References Cited

U.S. PATENT DOCUMENTS

| | | |
|---|---|---|
| 2005/0175533 A1 | 8/2005 | Thomas et al. |
| 2005/0180910 A1* | 8/2005 | Park et al. .................... 423/432 |

(Continued)

OTHER PUBLICATIONS

Zafar et al. "Integrated Hydrogen and Power Production with CO2 Capture Using Chemical-Looping Reforming-Redox Reactivity of Particles of CuO, Mn2O3, NiO and Fe2O3 Using SiO2 as support", 2005, Ind. Eng. Chem. Res. 44, 3485-3496.*

(Continued)

*Primary Examiner* — Stanley Silverman
*Assistant Examiner* — Syed Iqbal
(74) *Attorney, Agent, or Firm* — Wiggin and Dana LLP; Anthony P. Gangemi

(57) ABSTRACT

Methods and systems for sequestering carbon dioxide and generating hydrogen are disclosed. In some embodiments, the methods include the following: dissolving an iron based material that includes a carbonate-forming element into a solution including the carbonate-forming element and iron; increasing a pH of the solution to cause precipitation of iron oxide from the solution thereby generating a first source of $Fe_2O_3$; reacting the carbonate-forming element in the solution with a first source of carbon dioxide to produce a carbonate thereby sequestering the carbon dioxide; oxidizing the first source of $Fe_2O_3$ with a carbonaceous fuel thereby generating a second source of carbon dioxide and iron; and oxidizing the iron with steam thereby generating hydrogen and an iron oxide. Some embodiments include producing iron-based catalysts.

20 Claims, 2 Drawing Sheets

(51) Int. Cl.
*C01B 3/10* (2006.01)
*C01G 49/06* (2006.01)

(56) References Cited

U.S. PATENT DOCUMENTS

| | | |
|---|---|---|
| 2007/0049489 A1 | 3/2007 | Becue et al. |
| 2007/0217981 A1 | 9/2007 | Van Essendelft |
| 2009/0117024 A1 | 5/2009 | Weedon et al. |
| 2009/0169452 A1 | 7/2009 | Constantz et al. |

OTHER PUBLICATIONS

Kim, H.R., et al., "Synthesis of Iron-Based Chemical Looping Sorbents Integrated with pH Swing Carbon Mineral Sequestration," Journal of Nanoscience and Nanotechnology, vol. 9, No. 12, pp. 7422-7427, 2009.

Park, A-H.A., et al., "CO2 mineral sequestration: physically dissolution of serpentine and pH swing process," Chemical Engineering Science, vol. 59, Nos. 22-23, pp. 5241-5247, Nov.-Dec. 2004.

Park, A-H.A., et al., "Chemical and Physical Activation in Aqueous Carbonation of Serpentine for CO2 sequestration," Department of Chemical Engineering, The Ohio State University, Session 8: Global Climate Change: Science, Sequestration, and CO2 Utilization.

International Search Report and The Written Opinion of the International Searching Authority, International Application No. PCT/US2010/034921, filed May 14, 2010.

Zafar, Q., et al., "Integrated Hydrogen and Power Production with CO2 Capture Using Chemical-Looping Reforming-Redox Reactivity of Particles of CuO, Mn2O3, NiO, and Fe2O3 Using SiO2 as a Support," Industrial Engineering Chemical Research, vol. 44, pp. 3485-3496, Apr. 19, 2005.

Ryden, M., et al., "Using steam reforming to produce hydrogen with carbon dioxide capture by chemical-looping combustion," International Journal of Hydrogen Energy, vol. 31, pp. 1271-1283, Jan. 26, 2006.

Supplementary European Search Report, Application No. EP 10 77 5605, dated Aug. 14, 2013.

* cited by examiner

METHODS AND SYSTEMS FOR SYNTHESIZING IRON-BASED MATERIALS AND SEQUESTERING CARBON DIOXIDE

CROSS REFERENCE TO RELATED APPLICATION(S)

This application claims the benefit of U.S. Provisional Application No. 61/178,272, filed May 14, 2009, which is incorporated by reference as if disclosed herein in its entirety.

BACKGROUND

Since the industrial revolution, the amount of $CO_2$ in the atmosphere has risen from 280 ppm in 1800 to 370 ppm in 2000, mainly due to the consumption of fossil fuels. More than half of the energy used in the United States comes from the use of coal, and it is mostly used to generate electricity. Unfortunately, $CO_2$ is one of the greenhouse gases considered to be responsible for global warming. Moreover, the increased atmospheric $CO_2$ concentration will acidify the ocean and will change the chemistry of the surface ocean, leading to a potentially detrimental impact on the ecosystem. In order to meet the ever-increasing global energy demands, while stabilizing the atmospheric $CO_2$ level, current carbon emissions should be significantly reduced.

There have been significant research and development activities in the area of carbon capture and storage (CCS), including a number of integrated technologies (e.g., chemical looping processes) to combine $CO_2$ capture with electricity/chemical/fuel production. Chemical looping processes involve a sorbent, typically a metal, or more likely a low oxidation state metal oxide that can be oxidized in air. The oxide is reduced by carbonaceous fuels in a subsequent step. A variation of this approach oxidizes the metal not in air but in a chemical reaction with steam to produce a pure stream of $H_2$. The chemical looping processes also allow the inherent generation of the sequestration-ready $CO_2$ stream at higher pressures.

Once captured, $CO_2$ can be stored via geological sequestration, ocean disposal, mineral carbonation, and biological fixation. The mineral sequestration scheme is particularly attractive, since this process converts $CO_2$ into thermodynamically stable carbonates via the reaction of $CO_2$ with widely available non-carbonate minerals, such as serpentine and olivine. Therefore, the mineral sequestration process eliminates the risk of accidental $CO_2$ releases. The reaction underlining mineral carbonation mimics natural chemical transformations of $CO_2$, such as the weathering of rocks. The main challenges of this storage method have been the slow dissolution kinetics and large energy requirement associated with the mineral processing.

SUMMARY

The previously developed pH swing carbon mineral sequestration immobilizes the gaseous $CO_2$ into a thermodynamically stable solid, $MgCO_3$, using Mg-bearing minerals such as serpentine. This mineral carbonation technology is particularly promising since it generates value-added solid products: high surface area silica, iron oxide, and magnesium carbonate, while providing a safe and permanent storage option for $CO_2$. By carefully controlling the pH of the system, these solids products can be produced with high purity. The disclosed subject matter focuses on the synthesis of iron oxide particles as a chemical looping sorbent in order to achieve the integration between carbon capture and storage technologies. The synthesized iron-based chemical looping sorbent has been found to be as effective as commercially available iron oxide nanoparticles at converting syngas/carbonaceous fuel into high purity $H_2$, while producing a sequestration-ready $CO_2$ stream.

The disclosed subject matter utilizes the iron component of magnesium-bearing minerals, e.g., olivine and serpentine, during carbon mineral sequestration. These minerals often contain 5-10 percent by weight of iron, and the recovery and utilization of iron during the mineral processing increases the economic feasibility of carbon mineral sequestration technology. Among many applications of iron-based materials, the disclosed subject matter focuses on the synthesis of iron-based chemical looping sorbents, which can be used for carbon dioxide capture and hydrogen production, as well as the syntheses of iron-based catalysts to be used in the production of synthetic liquid fuels and hydrogen from carbonaceous materials including coal, biomass, and municipal solid wastes.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Some embodiments of the disclosed subject matter include methods and systems for sequestering carbon dioxide and generating hydrogen. Methods and systems according to the disclosed subject matter include combining pH swing carbon sequestration processes with chemical looping processes. pH swing processes are employed, which can sequestrate $CO_2$ while generating solid products: high surface area silica; iron oxide; and magnesium carbonate. Iron-based chemical looping sorbents are synthesized during the pH swing carbon mineral sequestration process. Thus, two CCS technologies are integrated. Processes including carbon mineral sequestration are used to generate a supply of $Fe_2O_3$, which is used by chemical looping processes for $H_2$ production. The $CO_2$ produced during chemical looping processes is then sequestered via mineral carbonation.

As shown in equations [1] and [2], pH swing processes are used to both consume a first source of carbon dioxide to produce carbonated minerals and thus sequester the carbon dioxide and also generate iron-based chemical looping sorbents from minerals, respectively:

$$\tfrac{1}{3}(Mg,Fe)_3Si_2O_5(OH)_4 + CO_2 = MgCO_3 + Fe + \tfrac{2}{3}SiO_2 + \tfrac{2}{3}H_2O; \quad [1]$$

and

$$Fe + NH_4OH \rightarrow Fe(OH)_3 \text{ (and ultimately } Fe_2O_3\text{)}. \quad [2]$$

As shown in equations [3] and [4], the iron-based chemical looping sorbents are then reduced via oxidation with a carbonaceous fuel to generate a second source of carbon dioxide for consumption in the pH swing processes. Finally, as shown in equations [5] and , the iron-based chemical looping sorbents are regenerated via oxidation with steam to generate hydrogen:

$$3CO+Fe_2O_3 \rightarrow 3CO_2+2Fe; \quad [3]$$

$$3H_2+Fe_2O_3 \rightarrow 3H_2O+2Fe; \quad [4]$$

$$3Fe+4H_2O \rightarrow Fe_3O_4+4H_2; \quad [5]$$

and $$4Fe_3O_4+O_2 \rightarrow 6Fe_2O \text{ (ultimately to } Fe_2O_3\text{)}. \quad [6]$$

Figure 1:
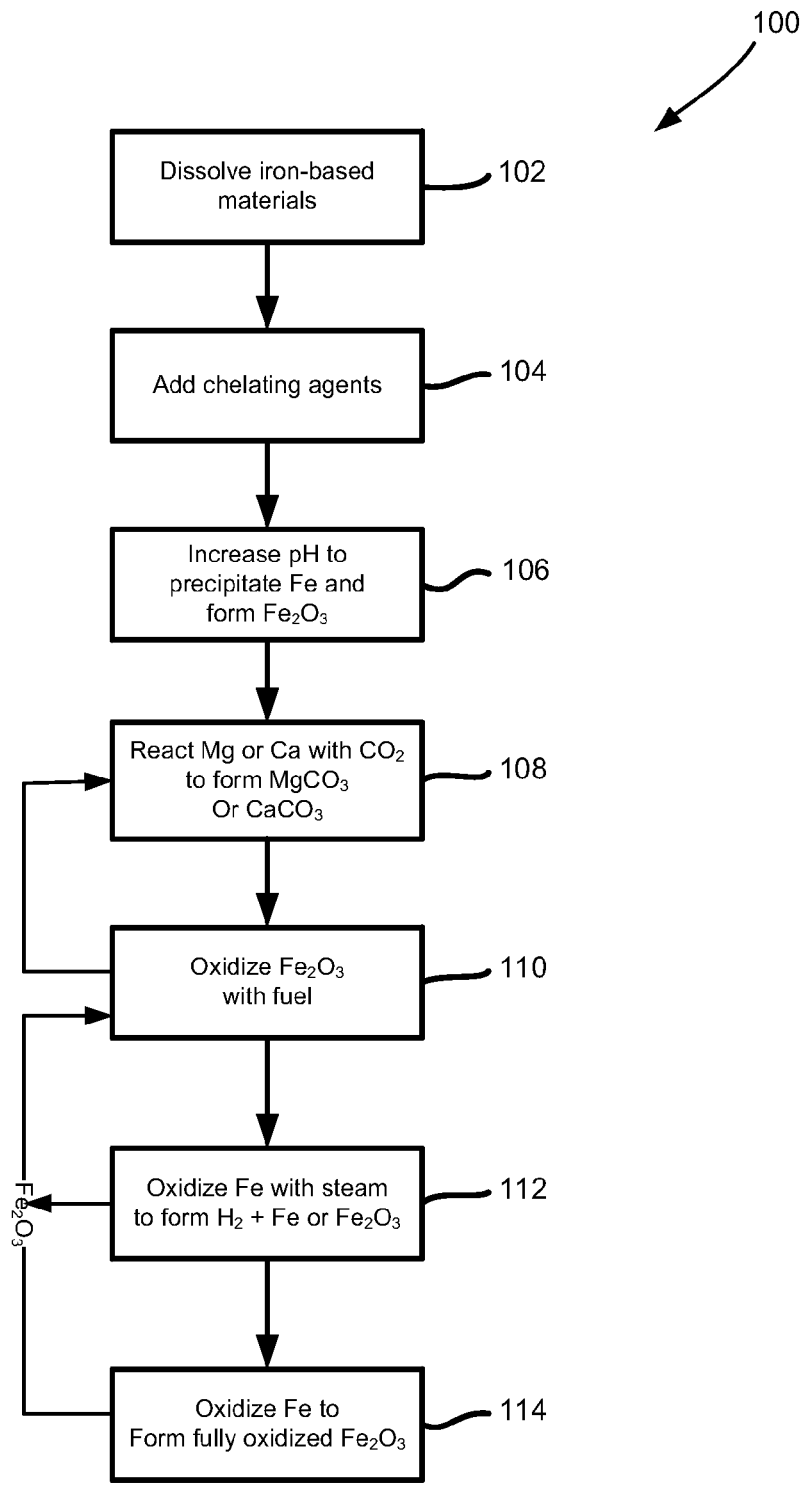
FIG. 1 is a chart of a method according to some embodiments of the disclosed subject matter.

Referring now to FIG. 1, some embodiments include a method 100 of sequestering carbon dioxide and generating hydrogen. At 102, an iron-based material such as a magnesium or calcium-bearing mineral or other carbonate-forming element or industrial wastes containing iron and a carbonate-forming element such as calcium or magnesium is dissolved to form a solution including a carbonate-forming element, e.g., magnesium and/or calcium, and iron. Magnesium-bearing minerals, e.g. olivine and serpentine, often contain 5-10 percent by weight of iron.

At 104, a chelating agent that targets magnesium, calcium, and iron is added to the solution before increasing a pH of the solution. The chelating agent is selected so as to be effective at leaching out iron content from the solution while allowing fast precipitation of iron oxide during the pH swing processes. Examples of chelating agents include acetic acid, citric acid, iminodiacetic acid, oxalic acid, phosphoric acid, gluconic acid, ascorbic acid, phthalic acid, a salt thereof, and a combination thereof. Citric acid has been found to provide higher dissolution as compared other chelating agents.

At 106, a pH of the solution is increased to cause precipitation of iron oxide from the solution thereby generating a first source of $Fe_2O_3$. In some embodiments, precipitation of iron oxide is conducted in the presence of support materials such as commercially available $Fe_2O_3$ particles. The support materials can be commercially available materials or high surface area silica produced during dissolution of minerals and/or wastes during method 100.

At 108, the carbonate-forming element, e.g., magnesium or calcium, in the solution is reacted with a first source of carbon dioxide to produce a carbonate, e.g., magnesium or calcium carbonate, thereby sequestering the carbon dioxide. In some embodiments, the first source of carbon dioxide is anthropogenic produced, e.g., emissions from coal-burning power plants and other man-made sources of carbon dioxide.

At 110, the first source of $Fe_2O_3$ is oxidized with a carbonaceous fuel thereby generating a second source of carbon dioxide and iron. The second source of carbon dioxide can then be utilized in step 108 to produce magnesium carbonate thereby sequestering the carbon dioxide. In some embodiments, the carbonaceous fuel includes gaseous fuels such as synthetic gas (carbon monoxide and hydrogen) and methane. In some embodiments, the carbonaceous fuel includes solid fuels including coal, biomass, and municipal solid wastes.

At 112, the iron is oxidized with steam thereby generating hydrogen and an iron oxide. At 114, the iron oxide is fully oxidized with oxygen thereby generating a second source of $Fe_2O_3$, which can be reacted with the carbonaceous fuel in 110 to generate additional carbon dioxide and iron.

Although not illustrated in FIG. 1, in some embodiments, iron-based catalysts, e.g., iron oxide, are produced. The produced iron oxide can also be used as catalysts for various industrial processes such as Fischer-Tropsch, water-gas-shift, and biomass conversion processes. These catalysts are currently produced using pure systems but can be produced utilizing methods and systems according to the disclosed subject matter from the waste stream of the carbon mineral sequestration process.

Figure 2:
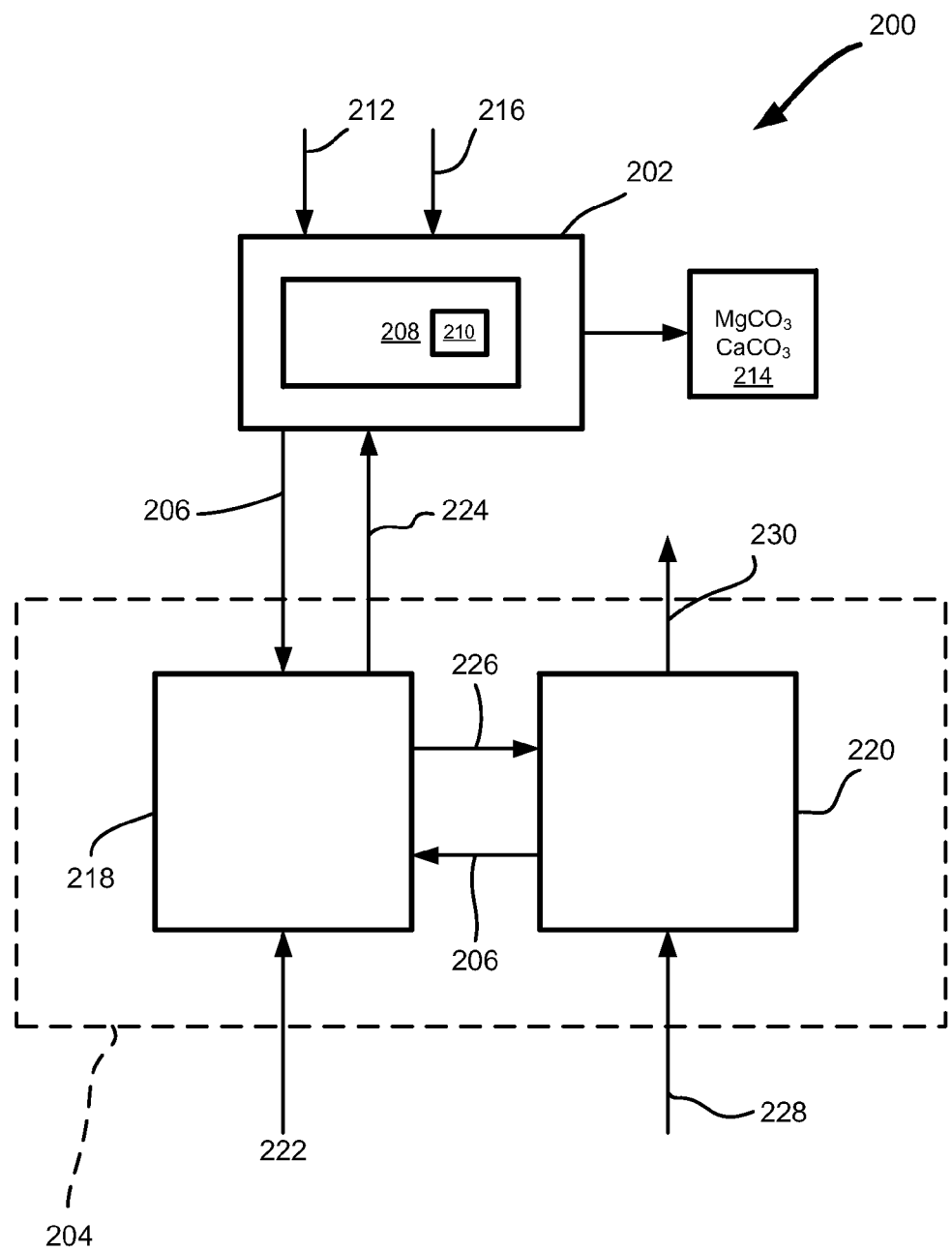
FIG. 2 is a schematic diagram of a system according to some embodiments of the disclosed subject matter.

Referring now to FIG. 2, some embodiments of the disclosed subject matter include a system 200 for sequestering carbon dioxide and generating hydrogen. System 200 includes a mineral and waste carbonation module 202 and a chemical looping module 204.

Mineral carbonation module 202 produces iron-based chemical looping sorbents 206 from minerals and industrial wastes 208 using pH swing processes. Iron-based chemical looping sorbents 206 include iron oxides such as $Fe_2O_3$ or similar. Minerals and industrial wastes 208 are carbonate-forming minerals and wastes including carbonate-forming minerals, e.g., magnesium and calcium-bearing minerals that include iron 210. The pH swing processes also consume a first source of carbon dioxide 212 to produce carbonated minerals 214 such as magnesium or calcium carbonate or similar. In some embodiments, the pH swing processes include the use of a chelating agent 216 to facilitate the extraction of iron 210 from minerals or industrial wastes 208.

In some embodiments, chemical looping module 204 includes a fuel reactor 218 and a hydrogen production reactor 220. In fuel reactor 218, chemical looping processes are utilized to reduce the iron-based chemical looping sorbents 206 via oxidation with a carbonaceous fuel 222 to generate a second source of carbon dioxide 224 for consumption by the pH swing processes in mineral carbonation module 202 and iron 226 (Fe, FeO). In hydrogen production reactor 220, iron-based chemical looping sorbents 206 are regenerated by reducing iron 226 via oxidation with steam 228 to generate hydrogen 230.

In some embodiments, system 200 includes a module for producing iron-based catalysts, e.g., iron oxide. The iron-based catalysts can be used for various industrial processes including Fischer Tropsch synthesis, waster-gas-shift reactions, and biomass conversion.

Methods and systems according to the disclosed subject matter offer benefits and advantages over known technologies. Technology according to the disclosed subject matter can be used for carbon dioxide capture and mineral sequestration, while also being used for hydrogen production.

Synthesized iron-based catalysts can be used in the production of synthetic liquid fuels and/or hydrogen from carbonaceous materials including coal, biomass, and municipal solid wastes. Synthesized iron oxide can also directly be used in the steel industry once it is recovered.

Technology according to the disclosed subject matter ties carbon storage technology with carbon capture technology as well as other sustainable energy conversion systems to improve the overall life cycle of carbon management technologies.

By controlling the pH of the system, technology according to the disclosed subject matter can be used to generate solid products from the mineral carbonation process: $SiO_2$-rich solids; iron oxide; and $MgCO_3*3H_2O$. The iron oxide and $MgCO_3$ produced would be highly pure.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of sequestering carbon dioxide and generating hydrogen, said method comprising:
producing iron-based sorbents including chemical looping sorbents from iron-based materials using pH swing processes, said pH swing processes consuming a first source of carbon dioxide to produce carbonated minerals;
reducing said iron-based chemical looping sorbents via oxidation with a carbonaceous fuel to generate a second source of carbon dioxide for consumption in said pH swing processes; and
regenerating said iron-based chemical looping sorbents that have been reduced via oxidation with steam to generate hydrogen.

2. The method according to claim 1, wherein said iron-based materials include calcium-bearing minerals, magnesium-bearing minerals, and industrial wastes containing iron and carbonate-forming elements including magnesium and calcium.

3. The method according to claim 1, further comprising producing iron-based catalysts including Fischer Tropsch catalysts, waster-gas-shift catalysts, and biomass conversion catalysts.

4. The method according to claim 1, wherein said iron-based catalysts and iron-based chemical looping sorbents include iron oxides such as $Fe_2O_3$.

5. A method of sequestering carbon dioxide and generating hydrogen, said method comprising:
dissolving an iron-based material that includes a carbonate-forming element into a solution including said carbonate-forming element and iron;
increasing a pH of said solution to cause precipitation of iron oxide from said solution thereby generating a first source of $Fe_2O_3$;
reacting said carbonate-forming element in said solution with a first source of carbon dioxide to produce a carbonate thereby sequestering said carbon dioxide;
oxidizing said first source of $Fe_2O_3$ with a carbonaceous fuel thereby generating a second source of carbon dioxide and iron; and
oxidizing said iron with steam thereby generating hydrogen and an iron oxide.

6. The method according to claim 5, further comprising producing iron-based catalysts including Fischer Tropsch catalysts, waster-gas-shift catalysts, and biomass conversion catalysts.

7. The method according to claim 5, wherein said iron-based materials include calcium-bearing minerals, magnesium-bearing minerals, and industrial wastes containing iron and carbonate-forming elements including magnesium and calcium.

8. The method according to claim 5, wherein said carbonate forming elements include magnesium, calcium, and a combination thereof.

9. The method according to claim 5, further comprising: oxidizing said iron oxide with oxygen thereby generating a source of fully oxidized $Fe_2O_3$.

10. The method according to claim 7, further comprising: adding one of various chelating agents that target Ma, Ca and Fe including acetic acid, citric acid, iminodiacetic acid, oxalic acid, phosphoric acid, gluconic acid, ascorbic acid, phthalic acid, a salt thereof, and a combination thereof to said solution before increasing a pH of said solution to dissolve said minerals or said wastes.

11. The method according to claim 5, further comprising: reacting said carbonate-forming element in said solution with said second source of carbon dioxide to produce a carbonate thereby sequestering said carbon dioxide.

12. The method according to claim 5, further comprising: reacting said second source of $Fe_2O_3$ with said carbonaceous fuel.

13. The method according to claim 5, wherein said carbonaceous fuel includes gaseous fuels including carbon monoxide and hydrogen and methane.

14. The method according to claim 5, wherein precipitation of iron oxide is conducted in the presence of support materials such as provided $Fe_2O_3$ particles.

15. A system for sequestering carbon dioxide and generating hydrogen, said system comprising:
a mineral and waste carbonation module for producing iron-based chemical looping sorbents from at least one of minerals and industrial wastes using pH swing processes, said pH swing processes consuming a first source of carbon dioxide to produce carbonated minerals; and
a chemical looping module for generating hydrogen, said chemical looping module including reducing said iron-based chemical looping sorbents via oxidation with a carbonaceous fuel to generate a second source of carbon dioxide for consumption in said pH swing processes and regenerating said iron-based chemical looping sorbents that have been reduced via oxidation with steam to generate hydrogen.

16. The system according to claim 15, wherein minerals include magnesium and calcium-bearing minerals including iron and industrial wastes include magnesium and calcium-bearing wastes including steel slag and fly ash containing iron.

17. The system according to claim 15, wherein said iron-based chemical looping sorbents include $Fe_2O_3$.

18. The system according to claim 15, wherein said pH swing processes include the use of at least one of acetic acid, citric acid, iminodiacetic acid, oxalic acid, phosphoric acid, gluconic acid, ascorbic acid, phthalic acid, a salt thereof, and a combination thereof as a chelating agent to facilitate the extraction of iron from said minerals.

19. The system according to claim 15, wherein said carbonaceous fuel includes gaseous fuels including synthetic gas (carbon monoxide and hydrogen) and methane, and solid fuels including coal, biomass, and municipal solid wastes.

20. The system according to claim 15, wherein said chemical looping module further comprises:
a fuel reactor for reducing said iron-based chemical looping sorbents via oxidation with a carbonaceous fuel to generate a second source of carbon dioxide; and
a hydrogen production reactor for regenerating said iron-based chemical looping sorbents that have been reduced via oxidation with steam to generate hydrogen.

* * * * *